United States Patent
Sak et al.

(10) Patent No.: US 9,620,108 B2
(45) Date of Patent: Apr. 11, 2017

(54) PROCESSING ACOUSTIC SEQUENCES USING LONG SHORT-TERM MEMORY (LSTM) NEURAL NETWORKS THAT INCLUDE RECURRENT PROJECTION LAYERS

(71) Applicant: Google Inc., Mountain View, CA (US)

(72) Inventors: Hasim Sak, New York, NY (US); Andrew W. Senior, New York, NY (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 14/557,725

(22) Filed: Dec. 2, 2014

(65) Prior Publication Data

US 2015/0161991 A1 Jun. 11, 2015

Related U.S. Application Data (60) Provisional application No. 61/914,277, filed on Dec. 10, 2013.

(51) Int. Cl.
| | |
|---|---|
| *G10L 15/16* | (2006.01) |
| *G06N 3/02* | (2006.01) |
| *G10L 15/08* | (2006.01) |
| *G10L 15/12* | (2006.01) |
| *G10L 15/02* | (2006.01) |

(52) U.S. Cl.
CPC ............. *G10L 15/08* (2013.01); *G10L 15/12* (2013.01); *G10L 2015/025* (2013.01)

(58) Field of Classification Search
CPC ... G10L 15/14; G10L 15/16; G10L 2015/025; G06N 3/02
USPC ................... 704/232, 236; 706/30
See application file for complete search history.

(56) References Cited

U.S. PATENT DOCUMENTS

| | | | | |
|---|---|---|---|---|
| 6,041,299 A | * | 3/2000 | Schuster | G10L 15/16 |
| | | | | 704/232 |
| 8,126,710 B2 | * | 2/2012 | Gemello | G10L 15/16 |
| | | | | 704/202 |
| 9,263,036 B1 | * | 2/2016 | Graves | G10L 15/16 |

(Continued)

OTHER PUBLICATIONS

Wöllmer et al., "A Multi-Stream ASR Framework for BLSTM Modeling of Conversational Speech", ICASSP 2011, pp. 4860 to 4863.*

(Continued)

*Primary Examiner* — Martin Lerner
(74) *Attorney, Agent, or Firm* — Fish & Richardson P.C.

(57) ABSTRACT

Methods, systems, and apparatus, including computer programs encoded on computer storage media, for generating phoneme representations of acoustic sequences using projection sequences. One of the methods includes receiving an acoustic sequence, the acoustic sequence representing an utterance, and the acoustic sequence comprising a respective acoustic feature representation at each of a plurality of time steps; for each of the plurality of time steps, processing the acoustic feature representation through each of one or more long short-term memory (LSTM) layers; and for each of the plurality of time steps, processing the recurrent projected output generated by the highest LSTM layer for the time step using an output layer to generate a set of scores for the time step.

20 Claims, 5 Drawing Sheets

(56) References Cited

U.S. PATENT DOCUMENTS

| | | | | |
|---|---|---|---|---|
| 2004/0015459 | A1* | 1/2004 | Jaeger | G06N 3/08 706/15 |
| 2014/0244248 | A1* | 8/2014 | Arisoy | G10L 15/197 704/232 |
| 2015/0170640 | A1* | 6/2015 | Sak | G10L 15/16 704/232 |
| 2015/0340034 | A1* | 11/2015 | Schalkwyk | G10L 15/26 704/235 |
| 2015/0356075 | A1* | 12/2015 | Rao | G06N 3/0445 705/2 |
| 2015/0356401 | A1* | 12/2015 | Vinyals | G06N 3/02 706/15 |
| 2016/0034812 | A1* | 2/2016 | Gibson | G06N 3/08 706/25 |
| 2016/0035344 | A1* | 2/2016 | Gonzalez-Dominguez | G10L 15/005 704/254 |
| 2016/0099010 | A1* | 4/2016 | Sainath | G10L 25/30 704/232 |
| 2016/0111108 | A1* | 4/2016 | Erdogan | G10L 21/0216 704/202 |
| 2016/0180215 | A1* | 6/2016 | Vinyals | G06F 17/2705 706/20 |
| 2016/0180838 | A1* | 6/2016 | Parada San Martin | G10L 15/16 704/232 |

OTHER PUBLICATIONS

Plahl et al., "Feature Combination and Stacking of Recurrent and Non-Recurrent Neural Networks for LVCSR". 2013 IEEE International Conference on Acoustics, Speech and Signal Processing, May 26-31, 2013, pp. 6714 to 6718.*

Graves et al., Speech Recogntiion With Deep Recurrent Neural Networks, 2013 IEEE International Confernece on Acoustics, Speech and Signal Processing, May 26-31 2013, pp. 6645 to 6649.*

Zegers et al., "Optimal Tailoring of Trajectories, Growing Training Sets and Recurrent Networks for Spoken Word Recognition", 1998 IEEE Joint International Conference on Neural Network Processings, 1998, pp. 2169 to 2174.*

Sak et al., "Long Short-Term Memory Based Recurrent Neural Network Architectures for Large Vocabulary Speech Recognition", ArXiv e-Prints, Feb. 5, 2014, 5 Pages.*

Graves et al., "Framewise Phoneme Classification with Bidirectional LSTM and Other Neural Network Architectures", Neural Networks, vol. 18, No. 5-6, Jun.-Jul. 2005, pp. 602 to 610.*

Vinyals et al., "Revisiting Recurrent Neural Networks for Robust ASR", Proceedings of the International Conference on Acoustics Speech and Signal Processing ICASSP, 2012, 4 Pages.*

Hochreiter et al., "Long Short-Term Memory", Neural Computation, vol. 9, No. 8, 1997, pp. 1735 to 1780.*

Mohammed N. Teli, "Dimensionality Reduction Using Neural Networks, Intelligent Engineering Systems Through Artificial Neural Networks", vol. 17, 2007.*

Landsiedel et al., "Syllabification of Conversational Speech Using Bidirectional Long-Short-Term Memory Neural Networks", 2011 IEEE International Conference on Acoustics, Speech and Signal Processing, ICASSP 2011, May 2011, pp. 5256 to 5259.*

Wikipedia, "Long Short-Term Memory", downloaded Jul. 8, 2016, 6 Pages.*

Ahmed et al., "Scalable Inference in Latent Variable Models," WSDM '12 Proceedings of the Fifth ACM International Conference on Web Search and Data Mining, Feb. 8-12, 2012, Seattle, Washington, US; 10 pages.

Andersen, "Improving End-to-End Availability Using Overlay Networks," Doctoral Dissertation, Massachusetts Institute of Technology, 2005, 150 pages.

Byers et al., "Simple Load Balancing for Distributed Hash Tables," Springer Berlin Heidelberg, 2003, 5 pages.

Karger et al., "Consistent Hashing and Random Trees: Distributed Caching Protocols for Relieving Hot Spots on the World Wide Web," STOC '97 Proceedings of the 29th Annual ACM Symposium on Theory of Computing, 1997, 10 pages.

Lamport, "Keynote: Recent Discoveries from Paxos," Proceedings of the 2004 International Conference on Dependable Systems and Networks (DSN '04), Jun. 28-Jul. 1, 2004, Florence, Italy; 1 page.

Stoica et al., "Chord: A Scalable Peer-to-Peer Lookup Service for Internet Applications," SIGCOMM '01, Aug. 27-31, 2001, San Diego, California, US; 12 pages.

* cited by examiner

PROCESSING ACOUSTIC SEQUENCES USING LONG SHORT-TERM MEMORY (LSTM) NEURAL NETWORKS THAT INCLUDE RECURRENT PROJECTION LAYERS

CROSS-REFERENCE TO RELATED APPLICATION

This application claims priority to U.S. Provisional Application No. 61/914,277, filed on Dec. 10, 2013. The disclosure of the prior application is considered part of and is incorporated by reference in the disclosure of this application.

BACKGROUND

This specification relates to generating phoneme representations of acoustic sequences.

Acoustic modeling systems receive an acoustic sequence and generate a phoneme representation of the acoustic sequence. The acoustic sequence for a given utterance includes, for each of a set of time steps, an acoustic feature representation that characterizes the audio input at the corresponding time step. The phoneme representation is a sequence of phonemes or phoneme subdivisions that the acoustic modeling system has classified as representing the received acoustic sequence. An acoustic modeling system can be used in, for example, a speech recognition system, e.g., in conjunction with a pronunciation modeling system and a language modeling system.

SUMMARY

In general, one innovative aspect of the subject matter described in this specification can be embodied in methods that include the actions of receiving an acoustic sequence, the acoustic sequence representing an utterance, and the acoustic sequence comprising a respective acoustic feature representation at each of a plurality of time steps; for each of the plurality of time steps, processing the acoustic feature representation through each of one or more long short-term memory (LSTM) layers, wherein the one or more LSTM layers are arranged in a sequence from a lowest LSTM layer to a highest LSTM layer, and wherein each of the one or more LSTM layers is configured to perform operations comprising: receiving a layer input at the time step; processing the layer input at the time step using one or more LSTM memory blocks to generate an LSTM output for the time step, processing the LSTM output using a recurrent projection layer to generate a recurrent projected output for the time step, and providing the recurrent projected output to the LSTM memory blocks for use in generating an LSTM output for a next time step; and for each of the plurality of time steps, processing the recurrent projected output generated by the highest LSTM layer for the time step using an output layer to generate a set of scores for the time step, the set of scores for the time step comprising a respective score for each of a plurality of phonemes or phoneme subdivisions, the score for each phoneme or phoneme subdivision representing a likelihood that the phoneme or phoneme subdivision represents the utterance at the time step.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The operations can further include: processing the LSTM output for the time step using a non-recurrent projection layer to generate a non-recurrent projected output for the time step. The method can further include: for each of the time steps, processing the recurrent projected output generated by the highest LSTM layer for the time step and the non-recurrent projected output generated by the highest LSTM layer for the time step using the output layer to generate the set of scores for the time step.

Each LSTM memory block can include one or more LSTM memory cells and each LSTM memory cell can generate a cell output that is aggregated to generate the LSTM output for the time step. The cell output $m_t$ for the time step can satisfy:

$$i_t = \sigma(W_{ix}x_t + W_{ir}r_{t-1} + W_{ic}c_{t-1} + b_i)$$

$$f_t = \sigma(W_{fx}x_t + W_{rf}r_{t-1} + W_{cf}c_{t-1} + b_f)$$

$$c_t = f_t \odot c_{t-1} + i_t \odot g(W_{cx}x_t + W_{cr}r_{t-1} + b_c)$$

$$o_t = \sigma(W_{ox}x_t + W_{or}r_{t-1} + W_{oc}c_t + b_o)$$

$$m_t = o_t \odot h(c_t)$$

where $i_t$ is an input gate activation at the time step, $f_t$ is a forget gate activation at the time step, $o_t$ is an output gate activation at the time step, $c_t$ is a cell activation at the time step, $c_{t-1}$ is a cell activation for a previous time step, $\odot$ is an element-wise product operation, g is a cell input activation function, h is a cell output activation function, each W term is a respective matrix of current weight values for the LSTM memory cell, $b_i$, $b_f$, $b_c$, and $b_o$ are bias vectors, and $r_{t-1}$ is a recurrent projected output generated by the recurrent projected layer for the previous time step.

The LSTM output for the time step can be a vector having a first dimensionality, and the recurrent projected output for the time step can be a vector having a second, smaller dimensionality. The set of scores for the time step can define a probability distribution over a set of Hidden Markov Model (HMM) states. The layer input for the time step for the lowest LSTM layer can be the acoustic feature representation for the time step. The layer input for the time step for each LSTM layer subsequent to the lowest LSTM layer in the sequence can be the layer output generated by a preceding LSTM layer in the sequence for the time step.

Particular embodiments of the subject matter described in this specification can be implemented so as to realize one or more of the following advantages. By reducing the dimensionality of the data that is fed back to an LSTM memory block, an acoustic modeling system can be easily trained. Additionally, the acoustic modeling system can more accurately generate phoneme representation of input acoustic sequences. Additionally, because the amount of data being transferred as part of processing an input acoustic sequence is reduced, an acoustic modeling system can be modified to include additional LSTM memory blocks while maintaining a satisfactory training time and processing time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
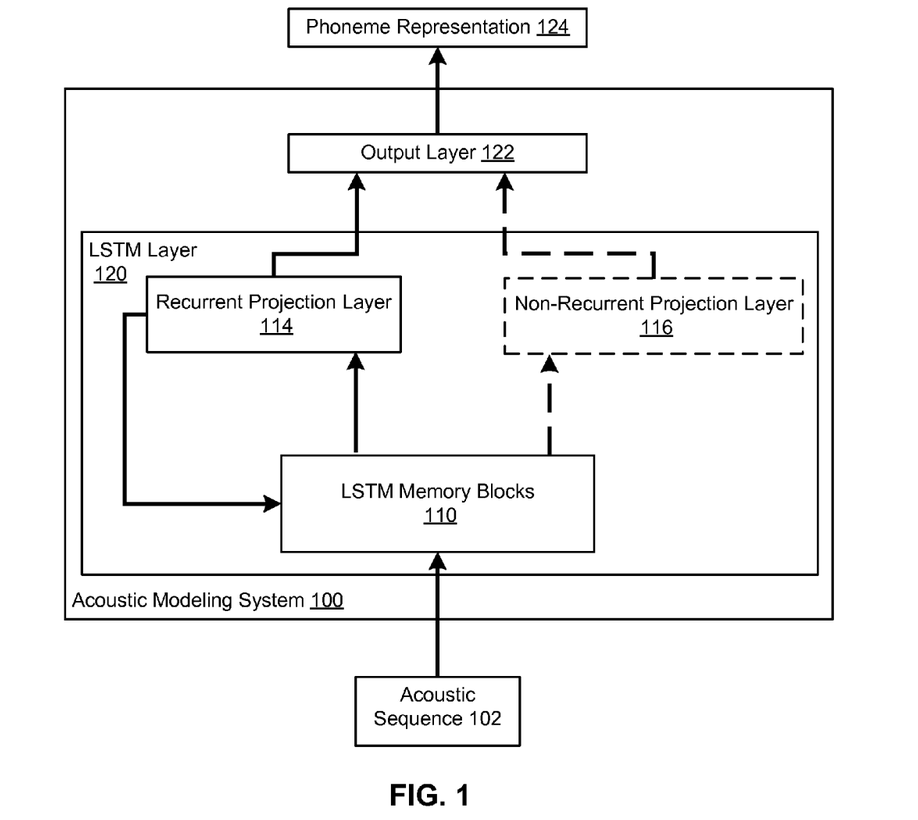
FIG. 1 shows an example acoustic modeling system.

FIG. 1 shows an example acoustic modeling system 100. The acoustic modeling system 100 is an example of a system implemented as computer programs on one or more computers in one or more locations, in which the systems, components, and techniques described below can be implemented.

The acoustic modeling system 100 receives acoustic sequences and generates phoneme representations of the received acoustic sequences. For example, the acoustic modeling system 100 can receive an acoustic sequence 102 and generate a phoneme representation 124 for the acoustic sequence 102.

The acoustic sequence 102 is a sequence that includes a respective acoustic feature representation, e.g., an acoustic feature vector, for each of a set of time steps. Each acoustic feature representation characterizes an utterance at the corresponding time step. The phoneme representation 124 for the acoustic sequence 102 includes a respective set of scores for each of the time steps. The set of scores for a given time step includes a respective score for each of a set of phonemes or a set of phoneme subdivisions. The score for a given phoneme or phoneme subdivision at a given time step represents a likelihood that the phoneme or phoneme subdivision is a representation of the utterance at the time step. For example, the set of scores may be probabilities that define a probability distribution over a set of Hidden Markov Model (HMM) states.

The acoustic modeling system 100 includes one or more long short-term memory (LSTM) layers, e.g., an LSTM layer 120, and an output layer 122. While only a single LSTM layer 120 is shown in FIG. 1 for clarity, in some implementations the acoustic modeling system 100 includes multiple LSTM layers arranged in a sequence from a lowest LSTM layer to a highest LSTM layer. At each time step, each LSTM layer receives an input from the preceding LSTM layer or, if the LSTM layer is the lowest layer in the sequence of LSTM layers, the acoustic feature representation for the time step, and generates a layer output for the time step.

Each LSTM layer includes one or more LSTM memory blocks and a recurrent projection layer, e.g., LSTM memory blocks 110 and recurrent projection layer 114 of the LSTM layer 120. The LSTM memory blocks 110 process the input received by the LSTM layer 120, e.g., the acoustic representation for the current time step or the layer output generated by the preceding LSTM layer, to collectively generate an LSTM output for the time step. An example LSTM memory block is described in more detail below with reference to FIG. 2.

The recurrent projection layer 114 receives the LSTM output generated by the LSTM memory blocks 110 and generates a recurrent projected output from the LSTM output in accordance with current values of a set of parameters for the recurrent projection layer. Generally, the recurrent projection layer 114 projects the LSTM output into a lower-dimensional space in accordance with the current values of the parameters of the recurrent projection layer. That is, the recurrent projected output has a lower dimensionality than the LSTM output received by the recurrent projection layer 114. For example, in some implementations, the LSTM output received by the recurrent projection layer 114 may have a dimensionality that is approximately twice the dimensionality of the recurrent projected output, e.g. one thousand versus five hundred or two thousand versus one thousand. As will be described in more detail below with reference to FIG. 2, the acoustic modeling system 100 provides the recurrent projected output generated by the recurrent projection layer 114 for a given time step to the LSTM memory blocks 110 for use in generating the LSTM output for the next time step in the acoustic sequence.

The LSTM layer 120 optionally also includes a non-recurrent projection layer 116 that receives the LSTM output generated by the LSTM memory blocks 110 and generates a non-recurrent projected output from the LSTM output in accordance with current values of a set of parameters for the non-recurrent projection layer. Generally, the non-recurrent projection layer 116 projects the LSTM output into the same lower-dimensional space as the recurrent projection layer 114 but using possibly different parameter values. If the LSTM layer 120 includes the non-recurrent projection layer 116, the acoustic modeling system 100 provides the recurrent projected output and the non-recurrent projected output as the layer output for the LSTM layer 120. If the LSTM layer 120 does not include the non-recurrent projection layer 116, the acoustic modeling system 100 provides the output of the recurrent projection layer 114 as the layer output for the LSTM layer 120.

The output layer 122 receives the layer output from the highest LSTM layer in the sequence of LSTM layers and generates the set of scores for the current time step in accordance with current values of a set of parameters of the output layer. Once the set of scores for each time step in the sequence has been generated, the acoustic modeling system 100 outputs the phoneme representation that includes the sets of scores for each of the time steps. In some implementations, the acoustic modeling system 100 can select the phoneme or phoneme subdivisions having the highest score at each time step and output a sequence of the selected phonemes or phoneme subdivisions as the phoneme representation for the acoustic sequence.

Figure 2:
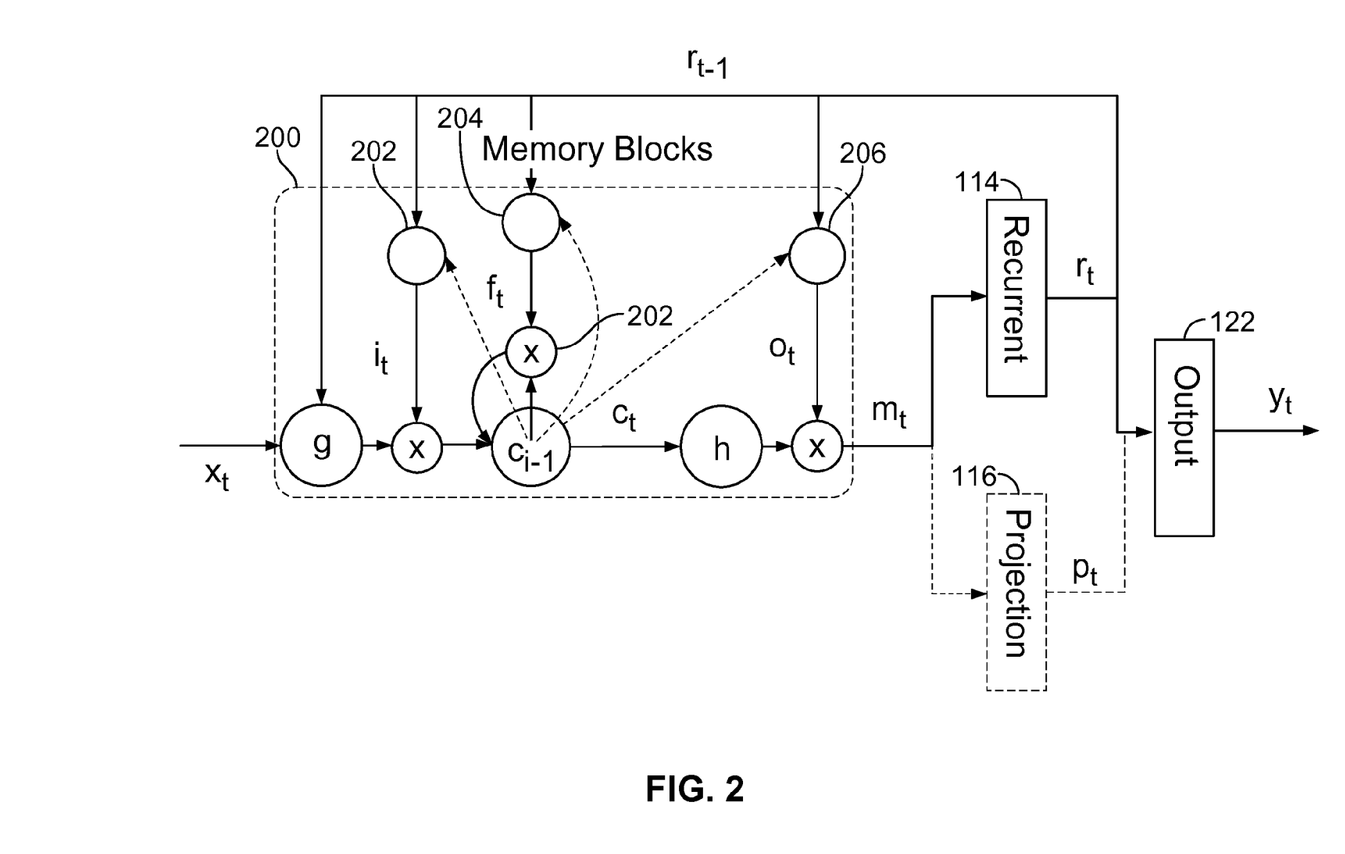
FIG. 2 shows an example LSTM memory block.

FIG. 2 shows an example LSTM memory block 200. The LSTM memory block 200 includes an LSTM memory cell that receives an input $x_t$ and generates an output $m_t$ from the input and from a previous recurrent projected output $r_{t-1}$. In particular, the input $x_t$ is the layer output for the current time step in an acoustic sequence or, if the LSTM memory block 200 is in the lowest LSTM layer, an acoustic feature representation at the current time step in an acoustic sequence and the previous recurrent projected output $r_{t-1}$ is the projected output generated by the recurrent projection layer from an output $r_{t-1}$ generated by the cell at the preceding time step in the acoustic sequence. That is, rather than a previous output $m_{t-1}$ of the LSTM memory cell at the preceding time step being fed back for use in calculating the output $m_t$ for the current time step, the previous recurrent projected output $r_{t-1}$ is fed back to the cell.

The LSTM memory cell includes an input gate 202 which controls the flow of input activations into the memory cell, and output gate 204 which controls the output flow of the cell, and a forget gate 206 which scales the internal state of the cell before adding it as input to the cell through the cell states.

In particular, the cell computes the output $m_t$ so that $m_t$ satisfies the following equations:

$$i_t = \sigma(W_{ix}x_t + W_{ir}r_{t-1} + W_{ic}c_{t-1} + b_i)$$

$$f_t = \sigma(W_{fx}x_t + W_{fr}r_{t-1} + W_{cf}c_{t-1} + b_f)$$

$$c_t = f_t \odot c_{t-1} + i_t \odot g(W_{cx}x_t + W_{cr}r_{t-1} + b_c)$$

$$o_t = \sigma(W_{ox}x_t + W_{or}r_{t-1} + W_{oc}c_t + b_o)$$

$$m_t = o_t \odot h(c_t)$$

where $i_t$ is the input gate activation at the current time step, $f_t$ is the forget gate activation at the current time step, $o_t$ is the output gate activation at the current time step, $c_t$ is the cell activation at the current time step, $c_{t-1}$ is the cell activation at the previous time step, $\odot$ is an element-wise product operation, g is the cell input activation function, h is the cell output activation function, each W term is a respective matrix of current weight values for the LSTM memory cell, and $b_i$, $b_f$, $b_c$, and $b_o$ are bias vectors.

Once the output $m_t$ has been computed, the recurrent projection layer 114 computes a recurrent projected output $r_t$ for the current time step using the output $m_t$. In particular, the recurrent projected output $r_t$ satisfies:

$$r_t = W_{rm}m_t$$

where $W_{rm}$ is a matrix of current values of weights for the recurrent projection layer 114. The recurrent projected output $r_t$ can then be provided to the output layer 122 for use in computing a phoneme representation or to the next LSTM layer in the sequence and fed back to the memory cell for use in computing the output $m_{t+1}$ at the next time step in the acoustic sequence.

If a non-recurrent projection layer 116 is included, the non-recurrent projection layer 116 computes a non-recurrent projected output $p_t$ for the current time step using the output $m_t$. In particular, the recurrent projected output $p_t$ satisfies:

$$p_t = W_{pm}m_t$$

where $W_{pm}$ is a matrix of current values of weights for the non-recurrent projection layer 116. The non-recurrent projected output $p_t$ can then, in combination with the recurrent projected output $r_t$, be provided to the output layer 122 for use in computing a phoneme representation or to the next LSTM layer in the sequence, but is not fed back to the memory cell.

The output layer 122 receives the recurrent projected output $r_t$ and, optionally, the non-recurrent projected output $p_t$ generated by the highest LSTM layer and computes a score vector $y_t$ for the current time step. The score vector for the current time step includes a respective score for each of a set of HMM states. For example, the respective scores may be probabilities that define a probability distribution over the set of HMM states. In particular, the score vector $y_t$ satisfies:

$$y_t = W_{yr}r_t + W_{yp}p_t + b_y$$

if the output layer 122 receives a non-recurrent projected output and satisfies $$y_t = W_{yr}r_t + b_y$$

if the output layer 122 does not receive a non-recurrent projected output, where $b_y$ is a bias vector for the output layer 122, and each W term is a respective matrix of current values of weights of the output layer 122.

Figure 3:
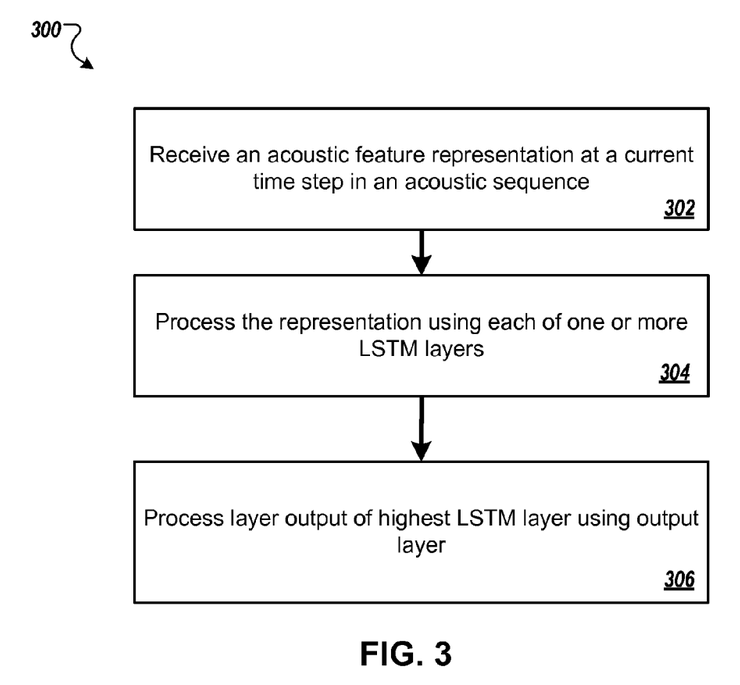
FIG. 3 is a flow diagram of an example process for processing an acoustic feature representation.

FIG. 3 is a flow diagram of an example process 300 for processing an acoustic feature representation. For convenience, the process 300 will be described as being performed by a system of one or more computers located in one or more locations. For example, an acoustic modeling system, e.g., the acoustic modeling system 100 of FIG. 1, appropriately programmed, can perform the process 300.

The system receives an acoustic feature representation at a current time step in an acoustic sequence (step 302).

The system processes the representation using each of one or more LSTM layers, e.g., the LSTM layer 120 of FIG. 1 (step 304). Each of the LSTM layers receives an input, e.g., the layer output from a preceding layer in the sequence of LSTM layers or, if the LSTM layer is the lowest layer in the sequence, the acoustic feature representation, and generates a layer output by processing the input through one or more LSTM blocks, a recurrent projection layer and, optionally, a non-recurrent projection layer. Processing an input using an LSTM layer is described in more detail below with reference to FIG. 4.

The system processes the layer output of the highest LSTM layer using an output layer, e.g., the output layer 120 of FIG. 1, to generate a set of scores for the current time step (step 306). That is, the system processes the recurrent projected output of the highest LSTM layer and, optionally, the non-recurrent projected output of the highest LSTM layer using the output layer, e.g., as described above with reference to FIG. 2. The scores for the current time step are probabilities for each of a set of HMM states that define a probability distribution over the set of HMM states.

Figure 4:
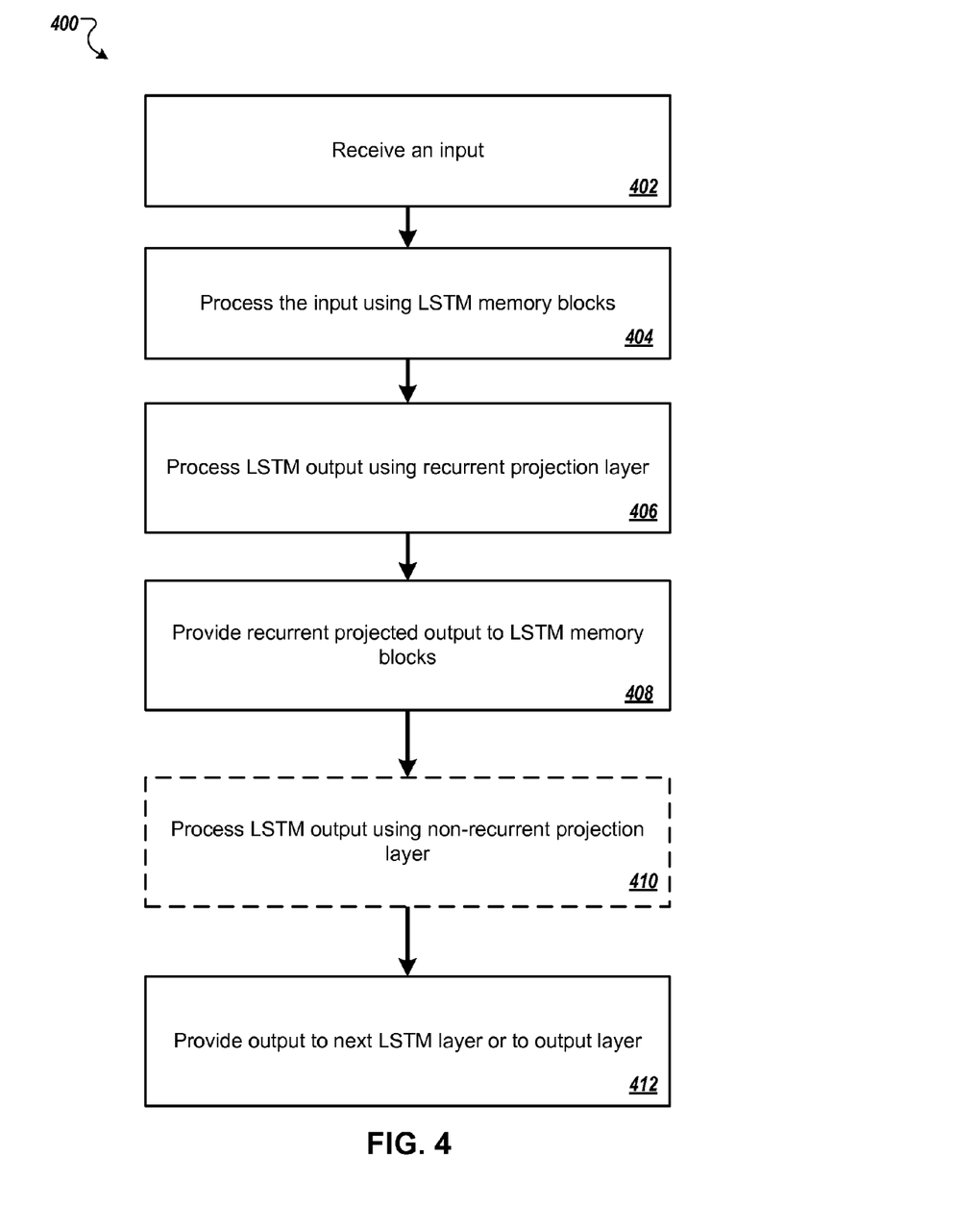
FIG. 4 is a flow diagram of an example process for processing a layer input using an LSTM layer.

FIG. 4 is a flow diagram of an example process 400 for processing a layer input using an LSTM layer. For convenience, the process 400 will be described as being performed by a system of one or more computers located in one or more locations. For example, an acoustic modeling system, e.g., the acoustic modeling system 100 of FIG. 1, appropriately programmed, can perform the process 400.

The system receives an input, e.g., the layer output from the preceding layer in the sequence of LSTM layers or the feature representation for the current time step (step 402).

The system processes the input using one or more LSTM memory blocks, e.g., the LSTM memory blocks 110 of FIG. 1, to generate an LSTM output (step 404). In particular, each memory cell of the LSTM memory blocks receives the input and uses the input and a recurrent projected output computed at the preceding time step in the acoustic sequence to generate a respective LSTM output.

The system processes the LSTM outputs using a recurrent projection layer, e.g., the recurrent projection layer 114 of FIG. 1, to generate a recurrent projected output for the current time step (step 406).

The system provides the recurrent projected output to the LSTM memory blocks for use in computing the LSTM output for the next time step in the acoustic sequence (step 408).

Optionally, the system processes the LSTM output using a non-recurrent projection layer, e.g., the non-recurrent projection 116 of FIG. 1, to generate a non-recurrent projected output for the current time step (step 410).

The system provides the recurrent projected output and, optionally, the non-recurrent projected output as the layer output to an output layer or to a next layer in the sequence of LSTM layers (step 412).

After trained values of the parameters of the LSTM memory blocks, the projection layers, and the output layer have been determined, the processes 300 and 400 can be performed at each time step of an acoustic sequence for which the desired phoneme representation is not known, e.g., to generate a predicted phoneme representation for the acoustic sequence. The processes 300 and 400 can also be performed for each time step of a training sequence, i.e., an acoustic sequence for which the desired phoneme representation is already known, as part of a training process to determine the trained values of the parameters of the system. For example, the training process may be a conventional LSTM training process, e.g., a backpropagation through time training process.

Figure 5:
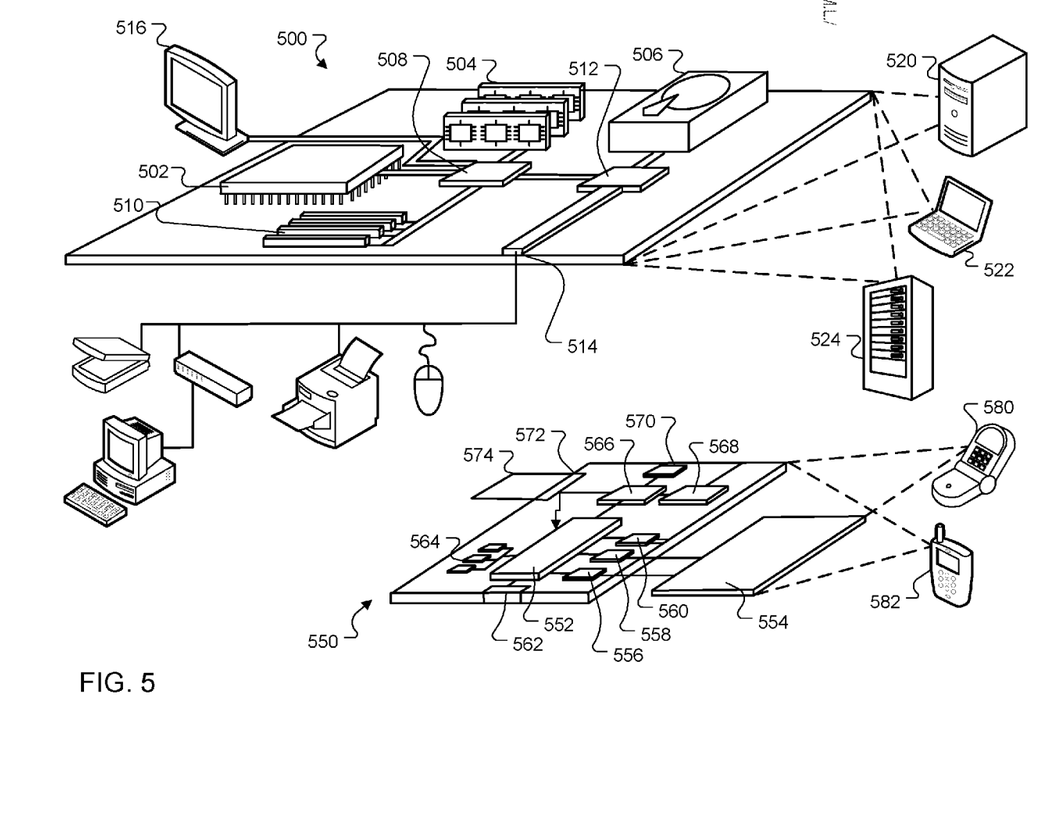
FIG. 5 shows an example of a computing device and a mobile computing device that can be used to implement the techniques described here.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an acoustic sequence, the acoustic sequence representing an utterance, and the acoustic sequence comprising a respective acoustic feature representation at each of a plurality of time steps;
for each of the plurality of time steps, processing the acoustic feature representation through each of one or more long short-term memory (LSTM) layers, wherein the one or more LSTM layers are arranged in a sequence from a lowest LSTM layer to a highest LSTM layer, and wherein each of the one or more LSTM layers is configured to perform operations comprising:
receiving a layer input at the time step;
generating an LSTM output for the time step by processing, through one or more LSTM memory blocks, the layer input at the time step and a previous recurrent projected output,
processing the LSTM output for the time step using a recurrent projection layer, wherein the recurrent projection layer is configured to;

generate a recurrent projected output for the time step by applying a matrix of current values of weights to the LSTM output to project the LSTM output to a lower dimensional space, and updating the previous recurrent projected output with the recurrent projected output, wherein the updated previous recurrent projected output is used by the LSTM memory blocks in generating an LSTM output for a next time step; and for each of the plurality of time steps, processing the recurrent projected output generated by the highest LSTM layer for the time step using an output layer to generate a set of scores for the time step, the set of scores for the time step comprising a respective score for each of a plurality of phonemes or phoneme subdivisions, the score for each phoneme or phoneme subdivision representing a likelihood that the phoneme or phoneme subdivision represents the utterance at the time step.

2. The method of claim 1, the operations further comprising:

processing the LSTM output for the time step using a non-recurrent projection layer to generate a non-recurrent projected output for the time step.

3. The method of claim 2, further comprising:

for each of the time steps, processing the recurrent projected output generated by the highest LSTM layer for the time step and the non-recurrent projected output generated by the highest LSTM layer for the time step using the output layer to generate the set of scores for the time step.

4. The method of claim 1, wherein each LSTM memory block comprises one or more LSTM memory cells, and wherein each LSTM memory cell generates a cell output that is aggregated to generate the LSTM output for the time step.

5. The method of claim 4, wherein the cell output $m_t$ for the time step satisfies:

$$i_t = \sigma(W_{ix}x_t + W_{ir}r_{t-1} + W_{ic}c_{t-1} + b_i)$$

$$f_t = \sigma(W_{fx}x_t + W_{fr}r_{t-1} + W_{cf}c_{t-1} + b_f)$$

$$c_t = f_t \odot c_{t-1} + i_t \odot g(W_{cx}x_t + W_{cr}r_{t-1} + b_c)$$

$$o_t = \sigma(W_{ox}x_t + W_{or}r_{t-1} + W_{oc}c_t + b_o)$$

$$m_t = o_t \odot h(c_t)$$

where $i_t$ is an input gate activation at the time step, $f_t$ is a forget gate activation at the time step, $o_t$ is an output gate activation at the time step, $c_t$ is a cell activation at the time step, $c_{t-1}$ is a cell activation for a previous time step, $\odot$ is an element-wise product operation, g is a cell input activation function, h is a cell output activation function, each W term is a respective matrix of current weight values for the LSTM memory cell, $b_i$, $b_f$, $b_c$, and $b_o$ are bias vectors, and $r_{t-1}$ is a recurrent projected output generated by the recurrent projected layer for the previous time step.

6. The method of claim 1, wherein the LSTM output for the time step is a vector having a first dimensionality, and wherein the recurrent projected output for the time step is a vector having a second, smaller dimensionality.

7. The method of claim 1, wherein the set of scores for the time step defines a probability distribution over a set of Hidden Markov Model (HMM) states.

8. The method of claim 1, wherein the layer input for the time step for the lowest LSTM layer is the acoustic feature representation for the time step.

9. The method of claim 8, wherein the layer input for the time step for each LSTM layer subsequent to the lowest LSTM layer in the sequence is the layer output generated by a preceding LSTM layer in the sequence for the time step.

10. A system comprising one or more computers and one or more storage devices storing instructions that when executed by one or more computers cause the one or more computers to perform first operations comprising:

receiving an acoustic sequence, the acoustic sequence representing an utterance, and the acoustic sequence comprising a respective acoustic feature representation at each of a plurality of time steps;

for each of the plurality of time steps, processing the acoustic feature representation through each of one or more long short-term memory (LSTM) layers, wherein the one or more LSTM layers are arranged in a sequence from a lowest LSTM layer to a highest LSTM layer, and wherein each of the one or more LSTM layers is configured to perform second operations comprising:

receiving a layer input at the time step;

generating, by processing the layer input at the time step and a previous recurrent projected output through one or more LSTM memory blocks, an LSTM output for the time step, processing the LSTM output for the time step using a recurrent projection layer, wherein the recurrent projection layer is configured to:

generate a recurrent projected output for the time step by applying a matrix of current values of weights to the LSTM output to project the LSTM output to a lower dimensional space, and updating the previous recurrent projected output with the recurrent projected output, wherein the updated previous recurrent projected output is used by the LSTM memory blocks in generating an LSTM output for a next time step; and for each of the plurality of time steps, processing the recurrent projected output generated by the highest LSTM layer for the time step using an output layer to generate a set of scores for the time step, the set of scores for the time step comprising a respective score for each of a plurality of phonemes or phoneme subdivisions, the score for each phoneme or phoneme subdivision representing a likelihood that the phoneme or phoneme subdivision represents the utterance at the time step.

11. The system of claim 10, the second operations further comprising:

processing the LSTM output for the time step using a non-recurrent projection layer to generate a non-recurrent projected output for the time step.

12. The system of claim 11, the first operations further comprising:

for each of the time steps, processing the recurrent projected output generated by the highest LSTM layer for the time step and the non-recurrent projected output generated by the highest LSTM layer for the time step using the output layer to generate the set of scores for the time step.

13. The system of claim 10, wherein each LSTM memory block comprises one or more LSTM memory cells, and wherein each LSTM memory cell generates a cell output that is aggregated to generate the LSTM output for the time step.

14. The system of claim 13, wherein the cell output $m_t$ for the time step satisfies:

$$i_t = \sigma(W_{ix}x_t + W_{ir}r_{t-1} + W_{ic}c_{t-1} + b_i)$$

$$f_t = \sigma(W_{fx}x_t + W_{fr}r_{t-1} + W_{cf}c_{t-1} + b_f)$$

$$c_t = f_t \odot c_{t-1} + i_t \odot g(W_{cx}x_t + W_{cr}r_{t-1} + b_c)$$

$$o_t = \sigma(W_{ox}x_t + W_{or}r_{t-1} + W_{oc}c_t + b_o)$$

$$m_t = o_t \odot h(c_t)$$

where $i_t$ is an input gate activation at the time step, $f_t$ is a forget gate activation at the time step, $o_t$ is an output gate activation at the time step, $c_t$ is a cell activation at the time step, $c_{t-1}$ is a cell activation for a previous time step, $\odot$ is an element-wise product operation, g is a cell input activation function, h is a cell output activation function, each W term is a respective matrix of current weight values for the LSTM memory cell, $b_i$, $b_f$, $b_c$, and $b_o$ are bias vectors, and $r_{t-1}$ is a recurrent projected output generated by the recurrent projected layer for the previous time step.

15. The system of claim 10, wherein the LSTM output for the time step is a vector having a first dimensionality, and wherein the recurrent projected output for the time step is a vector having a second, smaller dimensionality.

16. The system of claim 10, wherein the set of scores for the time step defines a probability distribution over a set of Hidden Markov Model (HMM) states.

17. The system of claim 10, wherein the layer input for the time step for the lowest LSTM layer is the acoustic feature representation for the time step.

18. The system of claim 17, wherein the layer input for the time step for each LSTM layer subsequent to the lowest LSTM layer in the sequence is the layer output generated by a preceding LSTM layer in the sequence for the time step.

19. A non-transitory computer storage medium encoded with a computer program, the computer program comprising instructions that when executed by one or more computers cause the one or more computers to perform first operations comprising:
  receiving an acoustic sequence, the acoustic sequence representing an utterance, and the acoustic sequence comprising a respective acoustic feature representation at each of a plurality of time steps;
  for each of the plurality of time steps, processing the acoustic feature representation through each of one or more long short-term memory (LSTM) layers, wherein the one or more LSTM layers are arranged in a sequence from a lowest LSTM layer to a highest LSTM layer, and wherein each of the one or more LSTM layers is configured to perform second operations comprising:
  receiving a layer input at the time step;
  generating, by processing the layer input at the time step and a previous recurrent projected output through one or more LSTM memory blocks, an LSTM output for the time step,
  processing the LSTM output for the time step using a recurrent projection layer, wherein the recurrent projection layer is configured to:
    generate a recurrent projected output for the time step by applying a matrix of current values of weights to the LSTM output to project the LSTM output to a lower dimensional space, and
    updating the previous recurrent projected output with the recurrent projected output, wherein the updated previous recurrent projected output is used by the LSTM memory blocks in generating an LSTM output for a next time step; and
  for each of the plurality of time steps, processing the recurrent projected output generated by the highest LSTM layer for the time step using an output layer to generate a set of scores for the time step, the set of scores for the time step comprising a respective score for each of a plurality of phonemes or phoneme subdivisions, the score for each phoneme or phoneme subdivision representing a likelihood that the phoneme or phoneme subdivision represents the utterance at the time step.

20. The non-transitory computer storage medium of claim 19, wherein the second operations further comprise:
  processing the LSTM output for the time step using a non-recurrent projection layer to generate a non-recurrent projected output for the time step, and wherein the first operations further comprise:
  for each of the time steps, processing the recurrent projected output generated by the highest LSTM layer for the time step and the non-recurrent projected output generated by the highest LSTM layer for the time step using the output layer to generate the set of scores for the time step.

* * * * *